(12) United States Patent
Rud

(10) Patent No.: US 9,885,610 B2
(45) Date of Patent: Feb. 6, 2018

(54) THERMOWELL SYSTEM WITH VIBRATION DETECTION

(71) Applicant: Rosemount Inc., Shakopee, MN (US)

(72) Inventor: Jason Harold Rud, Mayer, MN (US)

(73) Assignee: Rosemount Inc., Shakopee, MN (US)

( * ) Notice: Subject to any disclaimer, the term of this patent is extended or adjusted under 35 U.S.C. 154(b) by 483 days.

(21) Appl. No.: 14/578,849

(22) Filed: Dec. 22, 2014

(65) Prior Publication Data

US 2016/0178441 A1 Jun. 23, 2016

(51) Int. Cl.
| | | |
|---|---|---|
| *G01J 5/02* | (2006.01) | |
| *G01K 11/00* | (2006.01) | |
| *G01K 13/02* | (2006.01) | |
| *G01H 17/00* | (2006.01) | |
| *G01K 1/08* | (2006.01) | |
| *G01K 11/26* | (2006.01) | |

(52) U.S. Cl.
CPC .............. *G01J 5/027* (2013.01); *G01H 17/00* (2013.01); *G01K 1/08* (2013.01); *G01K 11/006* (2013.01); *G01K 11/26* (2013.01); *G01K 13/02* (2013.01)

(58) Field of Classification Search
CPC ........... G01J 5/027; G01H 17/00; G01K 1/08; G01K 11/006; G01K 11/26; G01K 13/02
See application file for complete search history.

(56) References Cited

U.S. PATENT DOCUMENTS

| | | |
|---|---|---|
| 4,137,768 A | 2/1979 | Tushie et al. |
| 4,324,945 A | 4/1982 | Sivyer |
| 4,510,343 A | 4/1985 | Sivyer |
| 4,737,038 A | 4/1988 | Dostoornian |
| 4,743,752 A * | 5/1988 | Olsen .............. G01D 5/268 250/206.1 |
| 4,778,538 A | 10/1988 | Lyman |
| 4,831,252 A * | 5/1989 | Ihnat ............... G01D 5/268 250/492.1 |
| 4,850,717 A | 7/1989 | Clark |
| 4,859,076 A | 8/1989 | Twerdochlib |
| 4,925,638 A | 5/1990 | Chakravarti |

(Continued)

FOREIGN PATENT DOCUMENTS

| | | |
|---|---|---|
| CN | 101881652 | 11/2010 |
| CN | 104048747 | 9/2014 |

(Continued)

OTHER PUBLICATIONS

First Chinese Office Action for Chinese Patent Application No. 201520363314.8, dated Sep. 29, 2015, 4 pages.

(Continued)

*Primary Examiner* — Lisa Caputo
*Assistant Examiner* — Philip Cotey
(74) *Attorney, Agent, or Firm* — Westman, Champlin & Koehler, P.A.

(57) ABSTRACT

A thermowell system for measuring a process temperature includes an elongate thermowell having a proximal end and a distal end configured to extend into a process fluid. An infrared sensor is configured to detect infrared radiation from the distal end of the thermowell and responsively provide a sensor output. Vibration detector circuitry is coupled to the infrared detector and configured to detect vibration of the thermowell as a function of oscillations in the sensor output.

20 Claims, 3 Drawing Sheets

(56) References Cited

U.S. PATENT DOCUMENTS

| | | |
|---|---|---|
| 4,958,938 A | 9/1990 | Schwartz |
| 5,147,137 A | 9/1992 | Thiesen |
| 5,302,027 A | 4/1994 | Park |
| 5,348,395 A | 9/1994 | Corr, II et al. |
| 5,399,018 A | 3/1995 | Hollander et al. |
| 5,590,240 A | 12/1996 | Rezabek |
| 5,632,556 A | 5/1997 | Sivyer |
| 5,858,311 A | 1/1999 | Bachtel |
| 6,053,632 A | 4/2000 | Leininger |
| 6,059,453 A | 5/2000 | Kempf et al. |
| 6,231,230 B1 | 5/2001 | Baldock |
| 6,390,673 B1 | 5/2002 | Camburn |
| 6,536,950 B1 | 7/2003 | Green et al. |
| 6,612,156 B1 | 9/2003 | Hakimuddin |
| 7,290,450 B2 | 11/2007 | Brown |
| 7,465,086 B1 | 12/2008 | Foreman, Jr. |
| 7,579,947 B2 | 8/2009 | Peluso |
| 7,644,633 B2 | 1/2010 | Schmidt |
| 9,188,488 B2 | 11/2015 | Engelstad et al. |
| 2002/0085617 A1 | 7/2002 | Gul |
| 2003/0028345 A1* | 2/2003 | Watkins .............. G01K 15/00 702/130 |
| 2004/0009075 A1 | 1/2004 | Meza et al. |
| 2005/0208908 A1 | 9/2005 | Karschnia |
| 2006/0017821 A1* | 1/2006 | Garvey, III ............. H04N 5/77 348/231.3 |
| 2006/0204367 A1 | 9/2006 | Meza et al. |
| 2006/0278827 A1* | 12/2006 | Sierra .................. G01J 1/04 250/338.1 |
| 2007/0085670 A1 | 4/2007 | Peluso |
| 2009/0199634 A1 | 8/2009 | Tonner |
| 2009/0211368 A1 | 8/2009 | Garnett |
| 2010/0135862 A1 | 6/2010 | Yoon |
| 2010/0316086 A1 | 12/2010 | Engelstad |
| 2011/0054822 A1 | 3/2011 | Bauschke et al. |
| 2011/0150033 A1 | 6/2011 | Egan |
| 2011/0150034 A1 | 6/2011 | Breimon |
| 2011/0301867 A1 | 12/2011 | Davis |
| 2012/0300808 A1 | 11/2012 | Martensson |
| 2013/0107908 A1 | 5/2013 | Lukach |
| 2013/0191556 A1 | 7/2013 | Holmstadt |
| 2013/0283928 A1 | 10/2013 | Wiklund |
| 2014/0036960 A1 | 2/2014 | Middleton |
| 2014/0269820 A1 | 9/2014 | Perrault et al. |
| 2015/0177072 A1* | 6/2015 | Murphy .................. G01J 5/02 374/121 |
| 2015/0181313 A1* | 6/2015 | Murphy .................. H04Q 9/00 340/870.02 |
| 2015/0330840 A1 | 11/2015 | Lukach |
| 2016/0178441 A1 | 6/2016 | Rud |

FOREIGN PATENT DOCUMENTS

| | | |
|---|---|---|
| DE | 103 45 299 | 7/2005 |
| DE | 10345299 B3 | 7/2005 |
| EP | 0 438 880 A2 | 7/1991 |
| EP | 1 835 270 | 9/2007 |
| JP | 2000-46653 | 2/2000 |
| WO | WO 2014/158423 | 10/2014 |

OTHER PUBLICATIONS

Office Action from U.S. Appl. No. 14/755,126, dated Jan. 19, 2016.
Notification of Transmittal of the International Search Report and the Written Opinion of the International Searching Authority from PCT/US2015/065744, dated Mar. 18, 2016.
Office Action from United States Patent Office, U.S. Appl. No. 14/755,126, dated Dec. 13, 2016, 19 pages.
Office Action from U.S. Appl. No. 14/755,126, dated Jul. 26, 2016.
Notification of Transmittal of the International Search Report and the Written Opinion of the International Searching Authority from PCT/US2016/036140, dated Oct. 5, 2016.
Office Action from U.S. Appl. No. 14/755,126, dated Jun. 20, 2017.
Communication from European Patent Application No. 15823256.1, dated Jul. 28, 2017.
Office Action from Chinese Patent Application No. 20150289909.8, dated Oct. 30, 2017.

* cited by examiner

THERMOWELL SYSTEM WITH VIBRATION DETECTION

BACKGROUND

The present invention relates to thermowells of the type used in temperature sensors used in industrial process control and monitoring systems. More specifically, the present invention relates to measurement of vibration of such thermowells.

Industrial process sensors and transmitters are used to sense various characteristics of fluid flowing through a conduit, or contained within a vessel. The transmitters sense process parameters such as differential pressure, line pressure, temperature, and pH.

Temperature sensors such as thermocouples, resistance temperature detectors or infrared sensors in process applications are usually protected by a metal or ceramic sheath known as a thermowell. The sensor electrical leads are isolated from each other and from the metal sheath and metal parts through some kind of isolating material. The assembly consisting of the sensor, sensor electrical leads, sensor sheath, isolating material and installation fittings is called a sensor assembly.

The sensor leads are connected to an electronic circuit that reads the sensor signal and convert it to a temperature reading. This electronic circuit can reside in an input electronic card of a control, monitoring or safety system or in a transmitter. Transmitters are usually installed relatively close to the temperature sensor.

The transmitter converts the sensor signal to a temperature measurement value and transmits the signal to a remote recipient such as a control, monitoring and/or safety system. The temperature value can be transmitted through different types of signals and media. It can be converted into an analog standard value such as 4 to 20 mA or through digital protocols such as HART®, Fieldbus, Profibus, DeviceNet, Modbus, Ethernet, etc. The transmitting media can be via wires, fiber optic, infrared or RF.

Temperature sensors used in industrial processes are typically fitted with a primary seal such as a thermowell. Thermowells are used to provide an additional protection to the temperature sensor. Thermowells are closed-end metal or ceramic tubes that protect temperature sensors from process pressure, erosion and corrosion. They also allow for the installing and removal of sensors without having to shut down the process. As the thermowell is a generally elongated tube, it is possible for the thermowell to vibrate and even break or crack. This may allow the release of process fluid and require an unscheduled shut down of an industrial process in order to repair any damage.

SUMMARY

A thermowell system for measuring a process temperature includes an elongate thermowell having a proximal end and a distal end configured to extend into a process fluid. An infrared sensor is configured to detect infrared radiation from the distal end of the thermowell and responsively provide a sensor output. Vibration detector circuitry is coupled to the infrared sensor and configured to detect vibration of the thermowell as a function of oscillations in the sensor output.

This Summary and the Abstract are provided to introduce a selection of concepts in a simplified form that are further described below in the Detailed Description. The Summary and the Abstract are not intended to identify key features or essential features of the claimed subject matter, nor are they intended to be used as an aid in determining the scope of the claimed subject matter.

DETAILED DESCRIPTION OF ILLUSTRATIVE EMBODIMENTS

A thermowell system for measuring a process temperature is provided which includes a thermowell which is configured to extend into a process fluid. An infrared sensor is configured to detect infrared radiation from the distal end of the thermowell. The detected radiation can be correlated with vibration or other movement of the thermowell.

Figure 1:
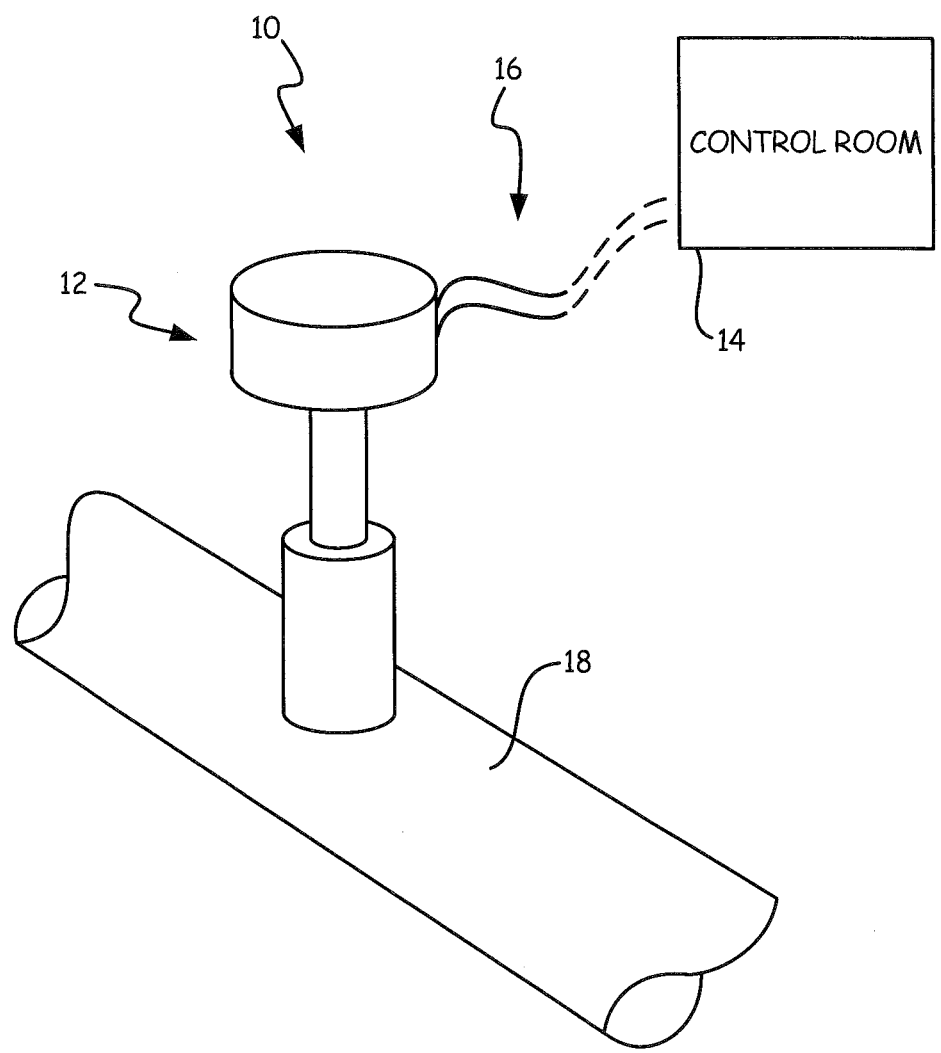
FIG. 1 is a simplified view of a process control or monitoring system including a temperature transmitter configured to sense a temperature of a process fluid.

FIG. 1 is a diagram illustrating process control system, 10, which includes sensor/transmitter 12 and control room equipment 14 connected over a transmission loop 16 that can be a two or more wire cable, or a fiber optic cable, or a wireless link. In this embodiment, sensor/transmitter 12 measures temperature. Sensor/transmitter 12 is mounted on process piping 18, and provides an output over loop 16 representing measured temperature of process fluid in piping 18. Sensor/transmitter 12 may be a temperature transmitter, may be a sensing device that includes transmitter electronics located within a sensor housing, or may be a sensing device that communicates with control room equipment 14 directly or through a separate transmitter.

Sensor/transmitter 12 transmits temperature information to control room equipment 14 in either analog or digital form. For example, sensor/transmitter 12 may transmit an analog signal representative of measured temperature by controlling the loop current flowing in loop 16 between 4 and 20 milliamps. In addition, sensor/transmitter 12 may transmit to control room 14 digital information related to measured temperature, to a measured secondary process parameter, or to diagnostic data. Transmission of digital information over loop 16 can, for example, be transmitted using the Highway Addressable Remote Transducer (HART®) protocol. Alternatively, temperature information, as well as secondary measurements and diagnostic information can be transmitted by sensor/transmitter 12 to control room 14 using an all digital protocol such as Foundation Fieldbus, Profibus, Modbus, etc. Alternatively, the loop may employ various wireless techniques. Alternatively, the loop may employ various wireless techniques, Wireless HART® communication protocol in accordance with the IEC 62591. Standard Ethernet, fiberoptic connection, or other communication channels may also be used. Sensor/transmitter 12 provides a thermowell system for measuring a process temperature.

Figure 2:
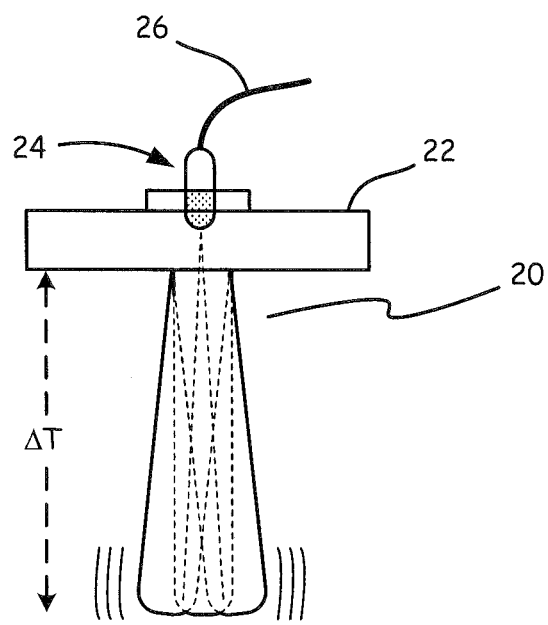
FIG. 2 is a front plan view of a thermowell used with the temperature transmitter of FIG. 1.

FIG. 2 is a front perspective view of a thermowell 20 coupled to transmitter 12 shown in FIG. 1. Thermowell 20 is mounted on flange 22 and extends into process piping 18 and comprises a hollow tube with its distal end sealed. The thermowell 20 may be formed of any appropriate material including metals, plastics, ceramics, composites, and combinations thereof.

As process fluid carried in pipe 18 moves past the thermowell 20, vortexes can be created. There are a number of factors that dictate how the vortexes will be generated and how they will affect the thermowell 20. If the vortexes are sufficiently large, the thermowell 20 will move in the vortexes and may approach a resonant frequency. This may cause permanent damage to the thermowell 20. The damage may be in the form of cracks or permanent bending, as well as completely breaking away from flange 22. It would be desirable to measure this vibration. However, a number of factors must be considered. Any vibration detector should be monitored and the information digitized or otherwise made available to measurement electronics. For example, vibration information may be monitored by a micro controller. In one example configuration, a primary measurement analog to digital converter which is used for measuring temperature is also used for monitoring vibrations. Further, in some configurations, the transmitter electronics is mounted remotely from the thermowell. Additionally, the vibration experienced by the thermowell may not be in a single direction and thus requires a multi axis vibration detector.

As illustrated in FIG. 2, an infrared (IR) spot sensor 24 is mounted at a proximal end of thermowell 20 and is directed to receive radiation from a distal end of the thermowell 20. Wiring 26 is used to couple IR sensor 24 to IR electronics (not shown in FIG. 2).

In accordance with Planck's Law, an interior wall of the bore through the thermowell 20 will emit radiation which is related to the temperature of the wall. The infrared sensor 24 is arranged to sense the radiation emitted in accordance with Planck's Law and responsively provide a sensor output. The sensor output can be correlated with the temperature of the thermowell 20 and provide an indirect measurement of the temperature of process fluid carried in process piping 18. The infrared sensor 24 may include optics configured to focus the sensor along the bore of the thermowell 20.

A temperature gradient $\Delta T$ is illustrated in FIG. 2 and is a temperature difference between the distal and proximal ends of the thermowell 20. This temperature difference causes a thermal gradient to be induced across the interior surface of the bore through the thermowell 20. If the IR sensor 24 is focused so that some of the sidewall of this interior bore comes into view as the thermowell moves away from the central axis, an error will be introduced into the temperature measurements. This error can be used for determining movement of the thermowell 20.

Figure 3:
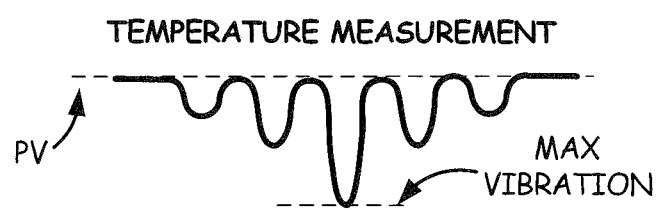
FIG. 3 is a graph of time versus amplitude showing oscillations in an output from an infrared sensor.

Vortexes in the process fluid will cause an oscillating movement of the distal end of the thermowell 20 with respect to the proximal end. With increasing movement, the infrared sensor 24 will be focused to a greater extent on the bore wall in its focal point creating a larger error in the temperature measurement which will maximize at the resonant frequency of the thermowell. As the thermowell 20 oscillates, the sensor 24 will periodically receive the infrared radiation from the distal tip of the thermowell. This oscillation is illustrated in FIG. 2 and the resulting output from infrared sensor 24 is illustrated in FIG. 3. As illustrated in FIG. 3, a baseline is provided by the actual process variable (temperature). The sensed infrared radiation is reduced as the thermowell 20 vibrates until it reaches a maximum vibration level. The sensitivity of the infrared sensor to vibrations is a function of the focal point of the infrared sensor 24 as well as the length and diameter of the bore through the thermowell 20. Further, the interior bore of the thermowell may be coated with material or shaped in a manner to change the sensitivity of the infrared sensor to vibrations.

The peaks and valleys in the output of the infrared sensor 24 illustrated in FIG. 3 can be evaluated to determine the temperature as well as provide a vibration diagnostics.

Figure 4:
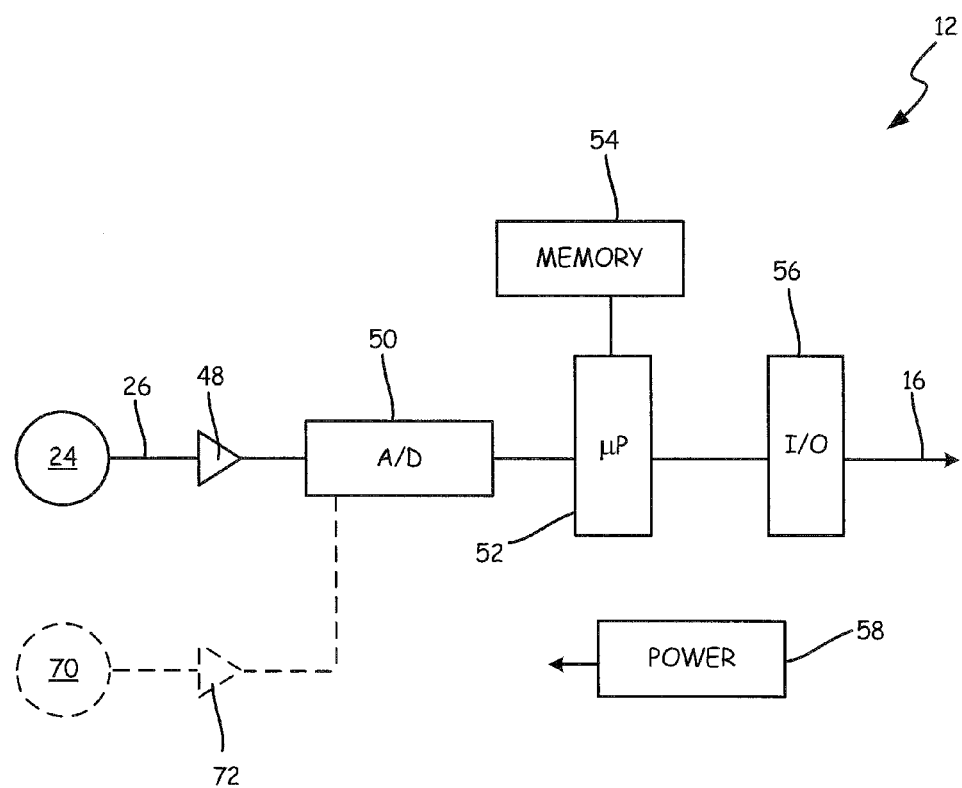
FIG. 4 is a simplified block diagram of transmitter circuitry used in the temperature transmitter of FIG. 1.

FIG. 4 is a simplified block diagram showing electrical circuitry of transmitter 12 in accordance with one example configuration. As illustrated in FIG. 4, the output of the infrared sensor 24 is provided to an amplifier 48 and digitized by analog to digital converter 50. A microprocessor 52 or other controller receives the digitized signal and operates in accordance with instructions stored in memory 54. Communication capabilities are provided by I/O circuitry 56 which is used for communicating over the process control loop 16. A power source 58 is provided for powering the circuitry of the transmitter 12. The power source may be an internal source such as a battery, and may be provided by an external source including power received over the process control loop 16.

During operation, the microprocessor 52 receives a digitized signal representative of the output from sensor 24. Microprocessor 52 can correlate this digitized signal with the temperature of the process fluid in accordance with Planck's Law. Temperature related information is transmitted on the process control loop 16 using I/O circuitry 56.

As discussed above, the microprocessor 52 is also capable of performing vibration diagnostics based upon variations in the output from sensor 24. For example, variations such as those illustrated in FIG. 3 can be correlated with vibrations of the thermowell 20 due to vortexes in the process fluid. The microprocessor 52 can compare the duration, frequency and/or amplitude of the vibrations to various thresholds stored in memory and thereby perform diagnostics. For example, if the thermowell 20 vibrates at a certain amplitude for a given duration, it may indicate that the stress fatigue limits of the thermowell are approaching a failure point. Thus, the diagnostics can be used to indicate that the thermowell should be replaced prior to its ultimate failure. The diagnostics can also be used to predict the remaining life span of the thermowell 20. This allows a plant operator to shut down the process operation and perform scheduled maintenance rather than waiting until a complete failure of thermowell 20.

FIG. 4 also illustrates an optional second sensor 70 coupled to the analog to digital converter 50 through optional amplifier 72. This can be used, for example, as a separate temperature sensor, such as a RTD or thermocouple placed in the thermowell 20.

As noted above, the same infrared sensor 24 can be used to perform both diagnostics as well as process variable (such as temperature) measurement. The determinations may be made simultaneously. However, the determinations may also be made alternatively during time slices or as desired. The diagnostic determination can be implemented using a software solution in accordance with programming instructions stored in memory 54. The thermowell may be optionally configured to enhance its sensitivity to vibrations. This may be through physical confirmations such as a portion of thermowell 20 having a thinned wall, or may be selected based upon particular materials. The vibrations sensed by the thermowell 20 may be due to process fluid flowing past the thermowell as well as due to vibrations received from other components in the process such as nearby process components. For example, a motor may induce vibrations in the process to which the probe 20 responds. As used herein, the term "vibration detection circuitry" includes implementations implemented based upon software stored in a memory, such as memory 54, of the device and implemented using an appropriate controller such as microprocessor 52. However, vibration detection circuitry may be implemented using any appropriate technique including dedicated analog components, dedicated digital components, shared components, or their combinations. The vibration detection circuitry may also be the same circuitry used to measure a process temperature based upon the output from the infrared sensor 24. Filters, including digital or analog filters, may be used to enhance the sensitivity of the vibration detection circuit to vibrations of a certain frequency, as well as reduce the sensitivity to certain frequencies as desired.

Although the present invention has been described with reference to preferred embodiments, workers skilled in the art will recognize that changes may be made in form and detail without departing from the spirit and scope of the invention. In addition to providing diagnostics related to the condition to the thermowell, the sensed vibration information can also be used to obtain information regarding operation of the process. For example, detection of vibrations can be used to determine that the process fluid carried in process piping 18 has begun moving. The vibration information may also be correlated with the flow rate of the process fluid. A sudden large vibration of a very short duration may indicate that something in the process fluid has impacted the thermowell 20. Any appropriate infrared sensor may be used. However, the sensor should preferably be able to detect vibration of the thermowell in a desired range, for example between 100 Hz and 1 kHz. A typical infrared sensor has a response time on the order of nanoseconds which is sufficiently fast to detect such vibrations. The infrared sensor may be spaced apart from the thermowell using a fiber optic bundle or other focusing technique. Although an infrared sensor is specifically described, such a configuration also includes an infrared imaging detector. In the example configuration shown in FIG. 4, the microprocessor provides vibration detector circuitry as well as temperature measurement circuitry. However, other configurations may also be employed.

What is claimed is:

1. A thermowell system for measuring a process temperature, comprising:
   an elongate thermowell having a proximal end and a distal end configured to extend into a process fluid;
   an infrared sensor configured to detect infrared radiation from the distal end of the thermowell and responsively provide a sensor output; and
   vibration detector circuitry coupled to the infrared sensor configured to detect vibration of the thermowell as a function of oscillations in the sensor output.

2. The thermowell system of claim 1, wherein the vibration detector circuitry is further configured to measure the process temperature based upon the sensor output.

3. The thermowell system of claim 1, wherein the vibration detector circuitry is further configured to perform diagnostics as a function of amplitude of the oscillations in the sensor output.

4. The thermowell system of claim 1, wherein the vibration detector circuitry is further configured to perform diagnostics as a function of frequency of the oscillations in the sensor output.

5. The thermowell system of claim 1, wherein the vibration detector circuitry is further configured to perform diagnostics as a function of duration of the oscillations in the sensor output.

6. The thermowell system of claim 1, wherein the vibration detector is further configured to identify movement of process fluid as a function of oscillations in the sensor output.

7. The thermowell system of claim 1, including I/O circuitry configured to provide an output related to detected vibration of the thermowell.

8. The thermowell system of claim 1, including I/O circuitry configured to provide a temperature of the process fluid.

9. The thermowell system of claim 1, wherein the infrared sensor is optically coupled to the elongate thermowell through a fiber optic cable.

10. The thermowell system of claim 1, including a temperature sensor mounted in the thermowell configured to sense the process temperature.

11. The thermowell system of claim 1, wherein the vibration detection circuitry is implemented by a microprocessor in accordance with programming instructions stored in a memory.

12. A method of detecting vibrations in an elongate thermowell of the type used to measure temperature of a process fluid, comprising:
    placing the elongate thermowell into a process fluid;
    arranging an infrared sensor to detect infrared radiation from a distal end of the thermowell and responsively providing a sensor output;
    identifying vibrations of the elongate thermowell as a function of oscillations in the sensor output.

13. The method of claim 12, and further including measuring the process temperature based upon the sensor output.

14. The method of claim 12, including performing diagnostics as a function of amplitude of the oscillations in the sensor output.

15. The method of claim 12, including performing diagnostics as a function of frequency of the oscillations in the sensor output.

16. The method of claim 12, including performing diagnostics as a function of duration of the oscillations in the sensor output.

17. The method of claim 12, including detecting movement of process fluid as a function of oscillations in the sensor output.

18. The method of claim 12, including providing an output related to detected vibration of the thermowell.

19. The method of claim 12, including providing a temperature of the process fluid.

20. The method of claim 12, including mounting a temperature sensor mounted in the thermowell configured to sense the process temperature.

* * * * *